United States Patent

Taguchi et al.

[11] Patent Number: 5,951,038
[45] Date of Patent: Sep. 14, 1999

[54] AIR BAG DEVICE HAVING INNER AND OUTER BAGS FOR SELECTIVELY DIRECTED EXPANSION THEREOF

[75] Inventors: Masahiro Taguchi, Hazu-gun; Tomoji Suzuki, Nagoya; Shoichi Yamanaka, Anjo; Shinichiro Kuroyanagi, Toyohashi, all of Japan

[73] Assignee: Denso Corporation, Kariya, Japan

[21] Appl. No.: 09/041,954

[22] Filed: Mar. 13, 1998

Related U.S. Application Data

[63] Continuation-in-part of application No. 08/694,830, Aug. 9, 1996, abandoned.

[30] Foreign Application Priority Data

Aug. 11, 1995 [JP] Japan .................................... 7-205574
May 27, 1996 [JP] Japan .................................... 8-131698

[51] Int. Cl.⁶ .................................................. B60R 21/24
[52] U.S. Cl. ........................ 280/729; 280/739; 280/743.1
[58] Field of Search ............................ 280/729, 743.1, 280/743.2, 739, 738

[56] References Cited

U.S. PATENT DOCUMENTS 4,360,223  11/1982  Kirchoff .
5,018,762   5/1991  Suzuki et al. .
5,114,180   5/1992  Kami et al. .
5,468,012  11/1995  Mihm .
5,494,314   2/1996  Kriska et al. .

FOREIGN PATENT DOCUMENTS 1-311930  12/1989  Japan .
3-281460  12/1991  Japan .
5-105024   4/1993  Japan .
2 265 118  9/1993  United Kingdom .

*Primary Examiner*—Paul N. Dickson
*Attorney, Agent, or Firm*—Pillsbury Madison & Sutro LLP

[57] ABSTRACT

An air bag device mounted in an instrument panel has an inflator for supplying gas, a bag body having a gas inlet hole, and an inner bag disposed inside of the bag body. The inner bag is formed with a pair of first through-holes and a second through-hole so that an opening area of the first through-hole is larger than that of the second through-hole. The inner bag is expanded by the gas supplied from the inflator, while a large amount of the gas is discharged from the first through-hole. Accordingly, the air bag body is expanded toward the waist of a passenger on a passenger seat. At the same time, the gas is discharged from the second through-hole to flow along an inside of a windshield, whereby the air bag can be also expanded toward the head of the passenger. As a result, even if the inflator is mounted in the instrument panel at its upper portion, the air bag device can securely protect the passenger on the passenger seat.

16 Claims, 6 Drawing Sheets

AIR BAG DEVICE HAVING INNER AND OUTER BAGS FOR SELECTIVELY DIRECTED EXPANSION THEREOF

This is a Continuation-in-Part of: National Appln. Ser. No. 08/694,830 filed Aug. 9, 1996 now abandoned.

CROSS-REFERENCE TO RELATED APPLICATIONS

The present application is related to and claims priority from Japanese Patent Application No. Hei 7-205574 and Hei 8-131698, incorporated herein by reference.

BACKGROUND OF THE INVENTION

1. Field of the Invention

The present invention relates to an air bag device for a passenger seat, which is expanded upon collision or the like of a vehicle to protect a passenger in a passenger seat, and particularly relates to an improvement of a structure thereof.

2. Description of Related Art

Conventionally, an air bag device used for protecting a passenger under collision of a vehicle is disclosed as described in Japanese Patent Laid-open No. Hei. 5-262195, for example. The air bag device has a sensor for detecting the collision, an inflator for generating and ejecting gas in response to a signal from the sensor, an air bag for expanding by the gas from the inflator and the like.

The air bag device inflates an air bag filled with gas between the passenger and inside parts like an instrument panel in order to alleviate a shock generated by the collision and the like of the vehicle. In this case, a distance in a passenger seat side between the passenger and a position where the air bag device can be installed is longer than that in a driver seat side. Therefore, it is preferable to expand the air bag straight toward the passenger to protect the passenger. Accordingly, the air bag is disposed in the instrument panel at its center portion to be opposed to the passenger.

However, when the air bag device is disposed in the instrument panel at its center portion, there occurs a problem that the other parts mounted in the instrument panel are restricted in terms of the degree of freedom of structures and shapes thereof.

SUMMARY OF THE INVENTION

The present invention has been accomplished in view of the above-mentioned problem and an object of the present invention is to provide an air bag device for a passenger seat wherein an air bag is certainly expanded toward the passenger seat side even if an inflator for expanding the air bag is installed in an instrument panel at its upper portion, whereby it is possible to securely protect the passenger. Another object of the present invention is to provide an air bag device for a passenger seat wherein an air bag is certainly expanded toward the passenger seat side even if an inflator for expanding the air bag is installed in an instrument panel at its upper portion, whereby the degree of freedom of structures and shapes of other parts mounted in the instrument panel is improved.

According to the present invention, an air bag device includes an inflator for generating gas, a bag body having a gas inlet hole communicating with the inflator and an inner bag disposed inside of the bag body to cover the gas inlet hole. The inner bag has a first through-hole, which is opposed to the waist of a passenger sitting on a passenger seat when the inner bag is expanded, and a second through-hole which is formed at front end side with respect to the first through-hole.

Therefore, the gas supplied from the inflator through the first and second through-holes on the inner bag is introduced into the bag body, whereby the bag body can be expanded sufficiently toward the waist of the passenger. That is, the bag body can be expanded toward the passenger to protect the passenger securely with a simple structure such that the inner bag is formed with the first and second through-holes.

Further, the above-mentioned air bag device can be mounted in an instrument panel at its upper portion, whereby the degree of freedom of mounting the other parts in the instrument panel is not restricted.

Further, the first through-hole is formed on the inner bag on the outer circumferential side with respect to the instrument panel, whereby the gas is securely supplied from the inner bag to the bag body. The bag body has a through-hole which is formed on the outer circumferential side with respect to the inner bag, whereby the gas supplied from the inflator is securely discharged from the bag body.

Further, the inner bag is formed in an arc-like shape, so that non-uniform force by the gas is not applied to the inner bag, whereby bursting strength of the inner bag can be improved.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 10B is a cross-sectional view showing the inner bag according to the eleventh embodiment;

DETAILED DESCRIPTION OF THE PRESENTLY PREFERRED EXEMPLARY EMBODIMENTS

Embodiments according to the present invention will be described below with respect to the drawings.

Figure 1:
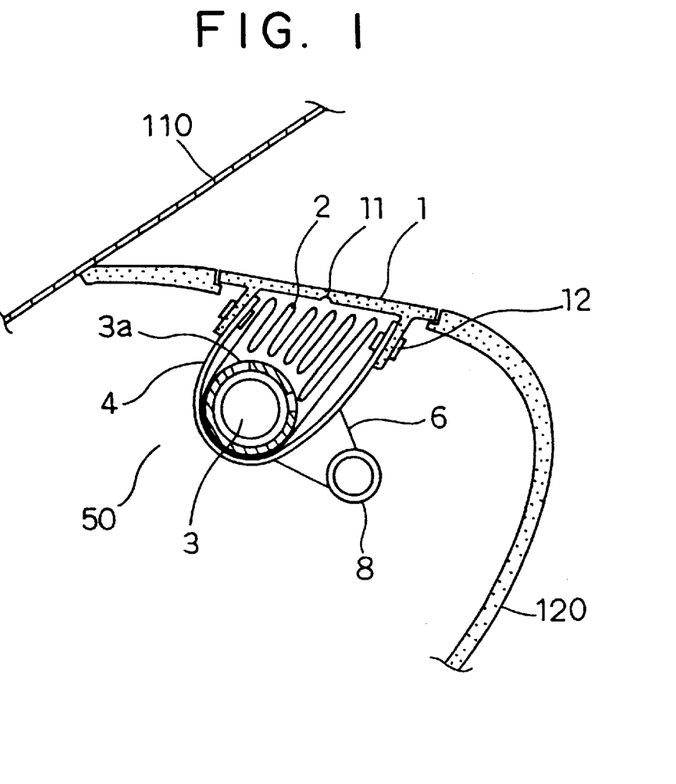
FIG. 1 is a cross-sectional view of an air bag device mounted in a vehicle according to a first preferred embodiment of the present invention.

FIG. 1 is a cross-sectional view showing an air bag device 50 mounted in a vehicle according to a first preferred embodiment of the present invention.

The air bag device is generally composed of a lid 1, an air bag 2, an inflator 3, and a case 4. The lid 1 normally covers the case 4 holding the air bag 2 and the inflator 3 and the like. The lid 1 is formed with a breakable lip line 11 as a thin-walled portion. The lid 1 is fixed to the case 4 by a plurality of rivets 12.

The inflator 3 is cylindrical, and it is fastened to the case 4 by nuts (not shown). The cylindrical surface of the inflator 3 is formed with a plurality of gas outlet holes 3a.

Figure 2A:
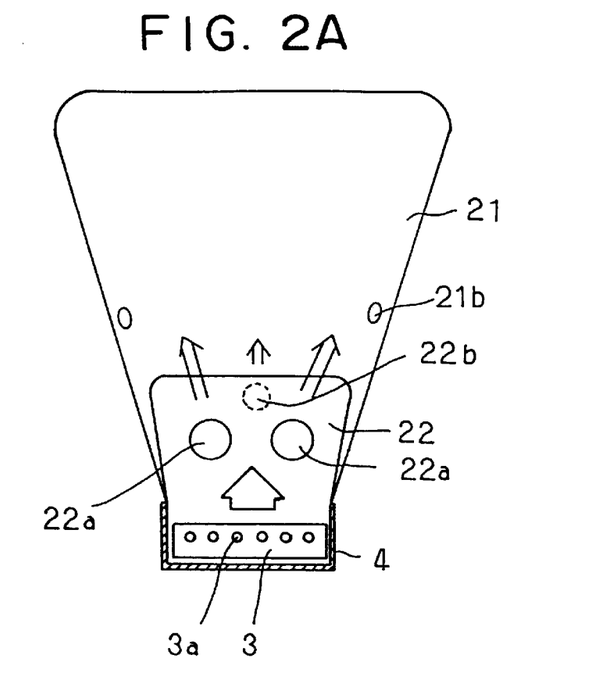
FIG. 2A is a front view showing the air bag device according to the first embodiment.
Figure 2B:
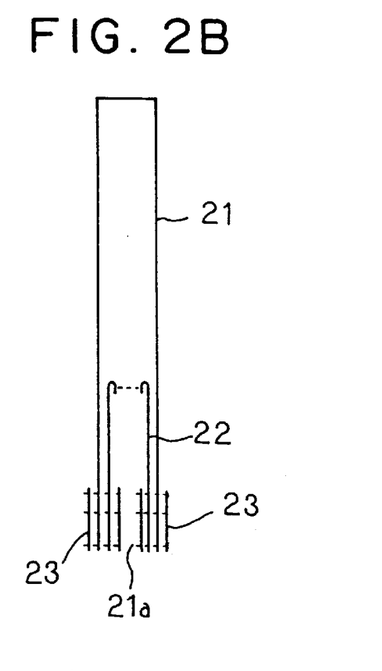
FIG. 2B is a cross-sectional view showing an air bag of the air bag device according to the first embodiment.

As shown in FIGS. 2A and 2B, the air bag 2 has a bag body 21 adapted to be supplied with gas from the inflator 3 and expanded by the gas thus supplied. The bag body 21 is formed with a gas inlet hole 21a communicating with the inflator 3.

An inner bag 22 is mounted within the bag body 21 through a plurality of reinforcing cloth members 23 to cover and reinforce the gas inlet hole 21a of the bag body 21. A part of the inner bag 22 also reinforces the gas inlet hole 21a. The bag body 21 is further formed with through-holes 21b for gradually allowing the gas supplied to the bag body 21 to escape to the outside thereof. The through-holes 21b are not closed by the inner bag 22 when the inner bag is expanded.

The inner bag 22 is formed with a pair of first through-holes 22a arranged at adjacent positions and having substantially the same opening area, and a second through-hole 22b having an opening area smaller than that of the first through-holes 22a.

Figure 3:
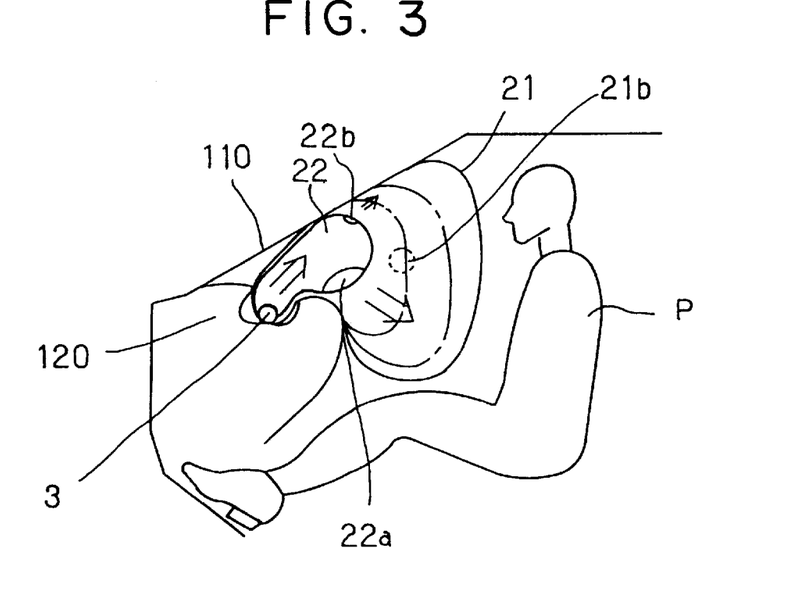
FIG. 3 is a schematic view showing the air bag device when the air bag is expanded in the vehicle according to the first embodiment.

As shown in FIG. 3, the first through-holes 22a of the inner bag 22 are formed at such position that when the inner bag 22 is expanded by the gas from the inflator 3, the first through-holes 22a are not closed by an instrument panel 120 of a vehicle and oppose the waist of a passenger P sitting on a passenger seat in the vehicle. The second through-hole 22b of the inner bag 22 is formed on a front end thereof to allow the gas to flow along the inner surface of a windshield 110 when the inner bag 22 is expanded.

As shown in FIG. 1, the case 4 of the air bag device 50 is fixed to a stay 6 by a plurality of bolts or the like (not shown), and the stay 6 is fixed to a mounting portion 8 inside of the instrument panel 120 by means of bolts (not shown). Thus, the air bag device 50 is mounted inside of the instrument panel 120 at its upper portion.

Next, the operation of the air bag device 50 in the first embodiment will be described.

When the gas is generated from the inflator 3 upon collision of the vehicle, the air bag is expanded by the gas supplied from the inflator 3. The thin-walled lip line 11 of the lid 1 is broken by the pressure of the gas expanding the air bag 2, so that the air bag 2 is allowed to come out of the case 4 and expands.

During the expansion of the air bag 2, the gas from the inflator 3 is first supplied to the inner bag 22 to expand it while being discharged from the first through-holes 22a and the second through-hole 22b. A larger amount of the gas is discharged from the first through-holes 22a than from the second through-hole 22b, because the opening area of the former is larger than that of the latter as shown in FIGS. 2A and 2B. Accordingly, the bag body 21 is expanded by the gas discharged from the first through-holes 22a of the inner bag 22 toward the waist of the passenger P. At the same time, the bag body 21 is expanded toward the head of the passenger P by the gas discharged from the second through-hole 22b of the inner bag 22 along the inner surface of the windshield 110.

That is, in the fully expanded condition of the bag body 21 as shown by the solid line in FIG. 3, there is almost no interference between the windshield 110 and the air bag 2, and the air bag 2 largely projects toward the waist of the passenger P. Further, the air bag 2 can be expanded sufficiently right and left by means of the first through-holes 22a.

Therefore, even if the air bag device 50 is mounted in the instrument panel 120 at its upper portion, with a simple structure such that the inner bag 22 is formed with the first through-holes 22a and the second through-hole 22b at arbitrary positions, there is almost no interference between the windshield 110 and the air bag 2, and the air bag 2 can quickly expand toward the passenger, especially toward the waist of the passenger. Consequently, a space between the passenger and the indoor parts like the instrument panel 120 can be filled with the expanded air bag 2.

Further, the degree of freedom of mounting the other parts in the instrument panel 120 is increased. For example, a glove compartment which is often disposed inside of the instrument panel 120 at its center portion or the like can be formed with sufficient size.

Figure 4:
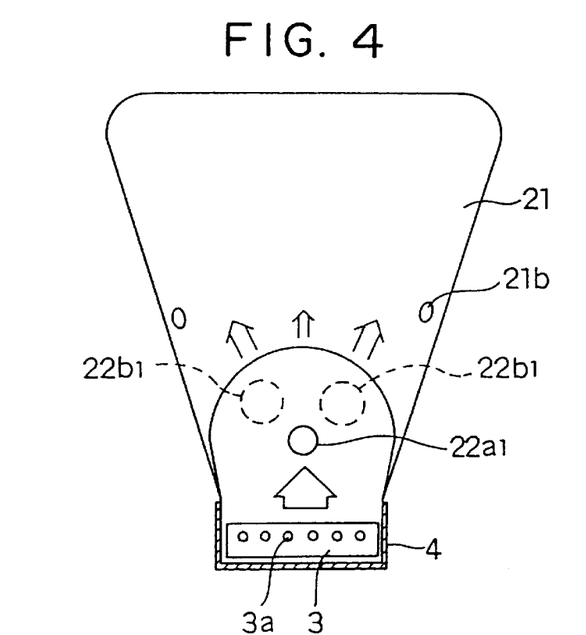
FIG. 4 is a front view showing an air bag device according to a second embodiment of the present invention.

FIG. 4 is a cross-sectional view showing an air bag device according to a second embodiment of the present invention.

In the second embodiment, an inner bag 22 is formed with a first through-hole 22a1, instead of the pair of first through-holes 22a in the first embodiment, and a pair of second through-holes 22b1 instead of the second through-hole 22b in the first embodiment. An opening area of the first through-hole 22a1 is smaller than that of the second through-hole 22b1. Further, an outer circumferential shape of the expanded inner bag 22 is formed in an arc-like shape, so that application of non-uniform force to the inner bag 22 when the gas is supplied thereto can be avoided.

In the first and second embodiments, the number of the first through-holes 22a and the second through-holes 22b and a relationship of the opening areas therebetween is arbitrarily selected to provide a given force for generating the gas in the inflator 3.

FIGS. 5A–5D show inner bags according to a third to a sixth embodiments.

Figure 5A:
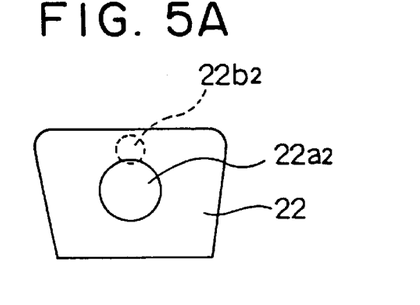
FIGS. 5A–5D are front views showing inner bags of an air bag device according to third through sixth embodiments of the present invention.

In the third embodiment shown in FIG. 5A, an inner bag 22 is formed with a first through-hole 22a2 instead of the pair of first through-holes 21a in the first embodiment and a second through-hole 22b2, and an opening area of the first through-hole 22a2 is almost equal to the total area of the pair of first through-holes 22a in the first embodiment.

Figure 5B:
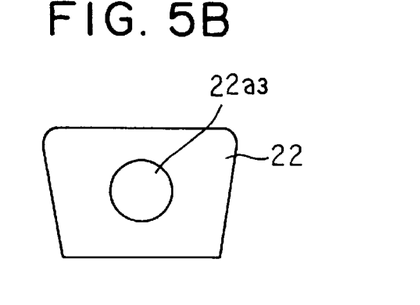

In the fourth embodiment shown in FIG. 5B, an inner bag 22 is formed with a first through-hole 22a3 instead of the pair of first through-holes 21a in the first embodiment, while a second through-hole as in the first embodiment is not formed. Therefore, with the inner bag 22, a bag body 21 can be expanded particularly toward the waist of a passenger.

Figure 5C:
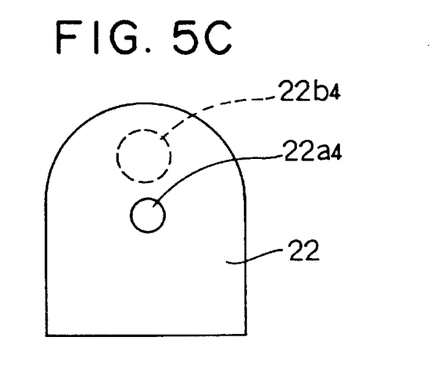

In the fifth embodiment shown in FIG. 5C, an inner bag 22 is formed with a first through-hole 22a4 and a second through-hole 22b4, while an opening area of the second through-hole 22b4 is larger than that of the first through-hole 22a4. In this embodiment, an outer circumferential shape of the expanded inner bag 22 is arc-like.

Figure 5D:
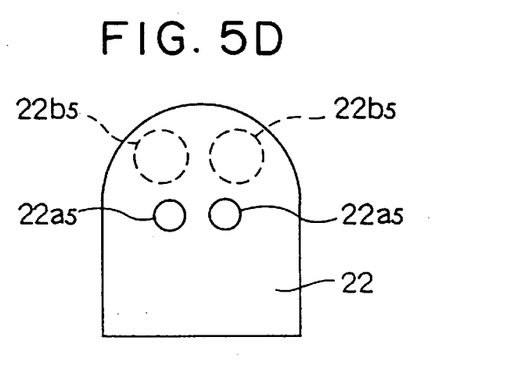

In the sixth embodiment shown in FIG. 5D, an inner bag 22 is formed with a pair of first through-holes 22a5 and a pair of second through-holes 22b5. An opening area of one of the second through-hole 22b5 is larger than that of one of the first through-hole 22a5.

In the above-mentioned embodiments, the numbers and the opening areas of the through-holes are not independently determined and may be set to arbitrary numbers and areas as long as the same effects and features as mentioned above can be attained.

When the inner bag 22 is made of mesh-type cloth, the air bag 2 can be expanded toward the head of the passenger by the gas discharged from meshes of the inner bag 22 without the second through-hole 22b.

Figure 6A:
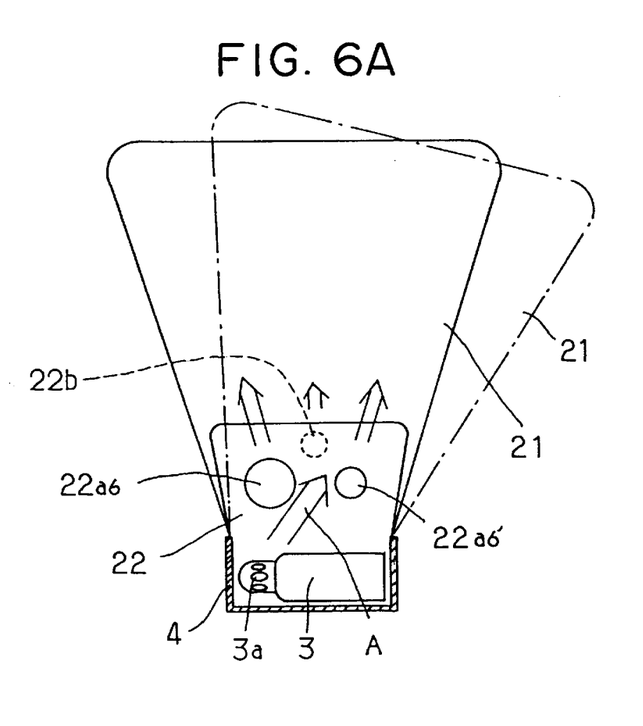
FIG. 6A is a front view showing an air bag device according to a seventh embodiment of the present invention.

FIG. 6A shows a cross-sectional view of an air bag device according to a seventh embodiment of the present invention.

In the seventh embodiment, an inner bag 22 is formed with a pair of first through-holes 22a6, 22a6' and a second through-hole 22b like the first embodiment.

Figure 6B:
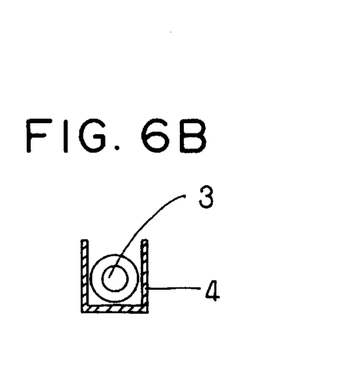
FIG. 6B is a cross-sectional view showing an inflator held in a case of the air bag device according to the seventh embodiment.

On the other hand, although the gas outlet holes 3a in the first embodiment are uniformly formed on the inflator 3, gas outlet holes 3a in the seventh embodiment are formed on an inflator 3 at an end thereof. Further, as shown in FIG. 6B, the inflator 3 is held in a case 4 without much space, whereby the gas is discharged from the inflator 3 in an oblique direction as indicated by arrow A in FIG. 6A.

Accordingly, when an opening area of one of the first through-holes 22a is the same as that of the other of the first through-holes 22a (refer to the first embodiment), the amounts of the gas respectively discharged from the first through-holes 22a are different. As a result, the air bag 2 is expanded not in a straight direction but in an oblique direction with respect to a direction of the passenger.

Therefore, in this embodiment, as shown in FIG. 6A, the opening area of the first through-hole 22a6 on a side of the gas outlet hole 3a of the inflator 3 is larger than that of the first through-hole 22a6' on the other side of the inflator 3. As a result, the amounts of the gas respectively discharged from the through-holes 22a6, 22a6' become almost equal to each other so that the air bag 2 can be expanded straight toward the passenger as shown by a chain line in FIG. 6A.

Figures 7A, 7B:
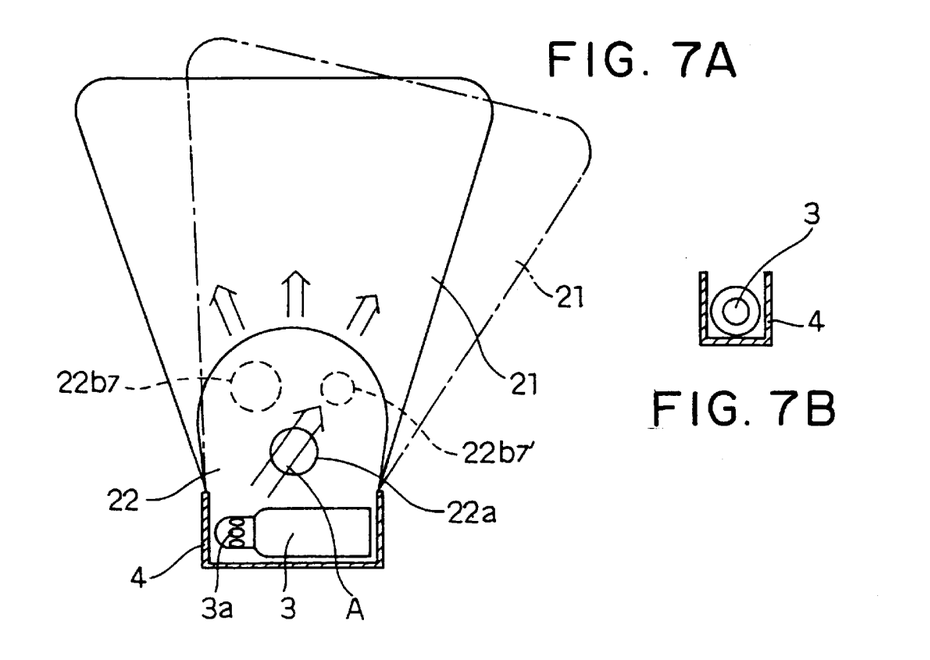
FIG. 7A is a front view showing an air bag device according to a eighth embodiment of the present invention.
FIG. 7B is a cross-sectional view showing an inflator held in a case of the air bag device according to the eighth embodiment.

FIG. 7A is a cross-sectional view showing an air bag device according to a eighth embodiment of the present invention.

In the eighth embodiment, an inflator 3 is the same type as the seventh embodiment as shown in FIGS. 7A, and the inflator 3 is held in a case 4 without much space as shown in FIG. 7B. An inner bag is formed with a first through-hole 22a7 and a pair of second through-holes 22b7, 22b7' Further, an opening area of the second through-hole 22b7 on a side of a gas outlet holes 3a of the inflator 3 is larger than that of the second through-hole 22b7' on the other side of the inflator 3. As a result, the amounts of the gas respectively discharged from the second through-holes 22b7, 22b7' becomes almost equal each other so that the air bag 2 can expand straight toward the passenger as shown by a solid line in FIG. 7A.

Figure 8A:
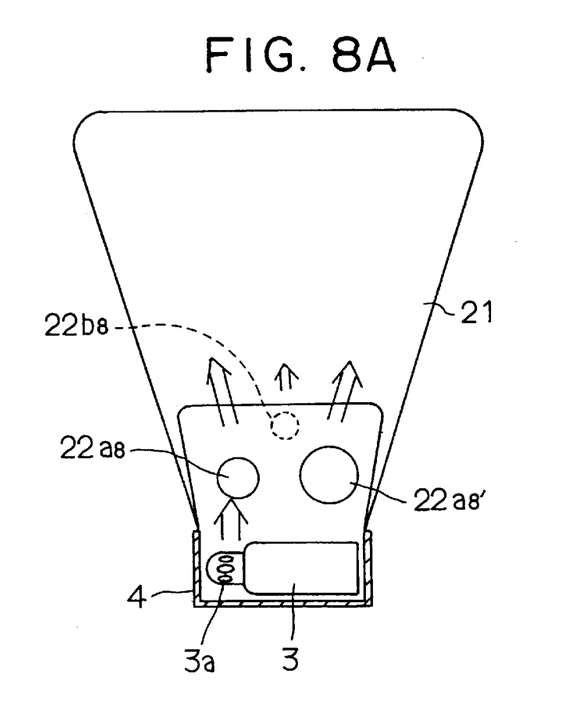
FIG. 8A is a front view showing an air bag device according to a ninth embodiment of the present invention.

FIG. 8A is a cross-sectional view of an air bag device according to a ninth embodiment of the present invention.

Figure 8B:
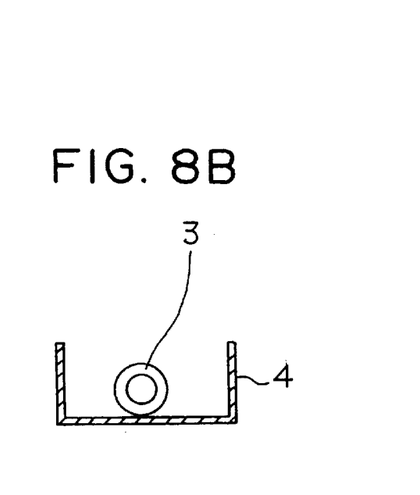
FIG. 8B is a cross-sectional view showing an inflator held in a case of the air bag device according to the ninth embodiment.

In the ninth embodiment, an inner bag 22 is formed with a pair of first through-holes 22a8, 22a8' and a second through-hole 22b8. An inflator 3 is the same type as in the seventh and eighth embodiments as shown in FIG. 8A. However, as shown in FIG. 8B, a space between the inflator 3 and a case 4 holding the inflator 3 is larger than that in the seventh and eighth embodiments. In this case, the gas which is discharged from gas outlet holes 3a of the inflator 3 and flows toward the first through-hole side of the inner bag 22 flows in a perpendicular direction with respect to the base of the case 4 as indicated by the arrow in FIG. 8A. Therefore, an opening area of the first through-hole 22a8 on a side of gas outlet holes 3a of the inflator 3 is smaller than that of the first through-hole 22a8' in the other side of the inflator 3. As a result, the amounts of the gas respectively discharged from the through-holes 22a8, 22a8' becomes almost equal to each other so that the air bag 2 can be expanded straight toward the passenger.

In this embodiment, the inner bag 22 may be formed with a pair of second through-holes 22b8', 22b8" instead of the second through-hole 22b8, and an opening area of the second through-hole 22b8' on the side of the gas outlet holes 3a of the inflator 3 may be smaller than that of the second through-hole 22b8" on the other side of the inflator 3.

Figure 9:
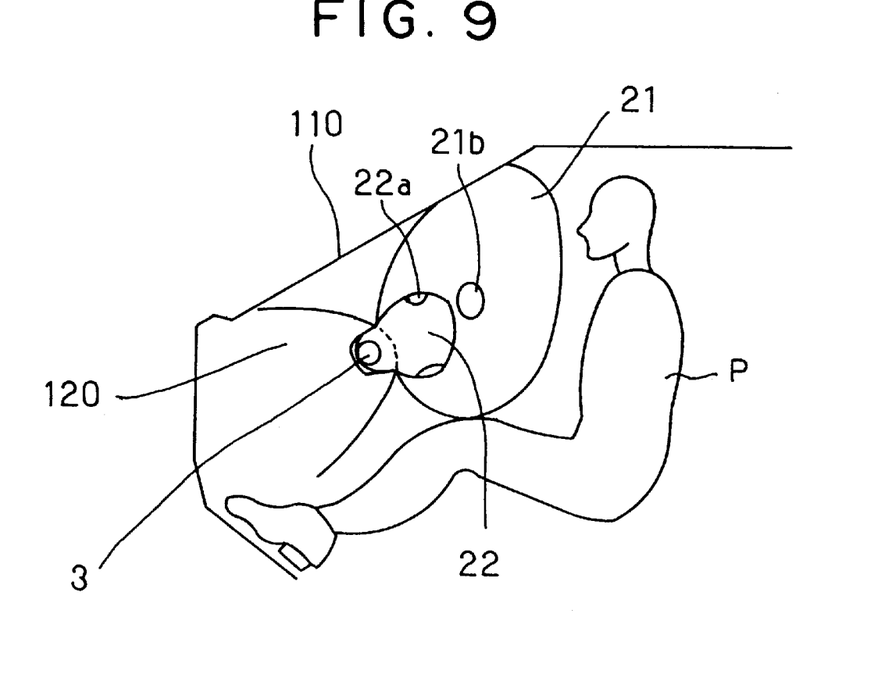
FIG. 9 is a schematic view showing an air bag device expanded in a vehicle according to a tenth embodiment of the present invention.

FIG. 9 shows an air bag device mounted in a vehicle according to a tenth embodiment of the present invention.

In the tenth embodiment, the air bag device is mounted in an instrument panel 120 not at its upper portion but at its center portion. An inner bag 22 is formed with a first through-hole 22a and a second through-hole 22b. The first through-hole 22a is opposed to a windshield 110 and the second through-hole 22b is opposed to the leg of a passenger P when the inner bag 22 is expanded. As a result, a bag body 21 can be expanded upward and downward with respect to the passenger P by gas discharged from the through-holes 22a, 22b, whereby non-uniform projection of the bag body 21 is prevented and the upper half of the body of the passenger can be protected securely.

Figure 10A:
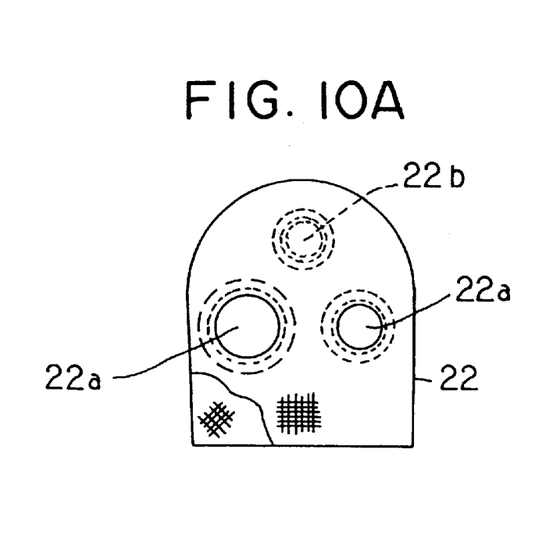
FIG. 10A is a front view showing an inner bag according to an eleventh embodiment.
Figure 10B:
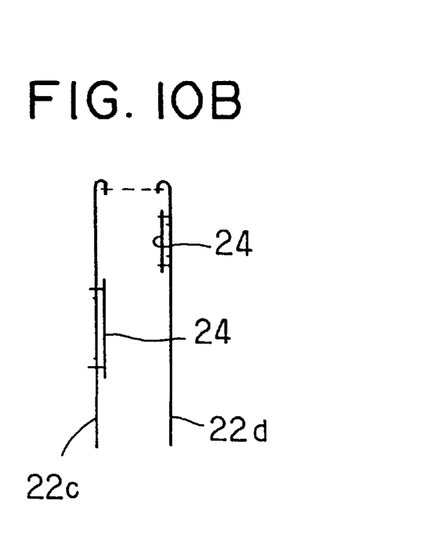

FIGS. 10A, 10B show an inner bag according to an eleventh embodiment of the present invention.

An inner bag 22 is made of two pieces of cloth 22c, 22d by sewing them together into a bag-like shape. In sewing the inner bag 22, bias directions of yarns of the cloth 22c and the cloth 22d cross at right angles to each other. Accordingly, when the outer peripheries of the cloths 22c, 22d are sewn together by threads, the sewed portion can be strengthened and will not be frayed. Further, ring-like shaped reinforcing cloths 24 are sewed on the outer circumferential side of through-holes 22a and 22b of the inner bag 22. Accordingly, the inner bag 22 can be securely prevented from tearing at the outer circumference of the through-holes 22a and 22b.

Figure 11:
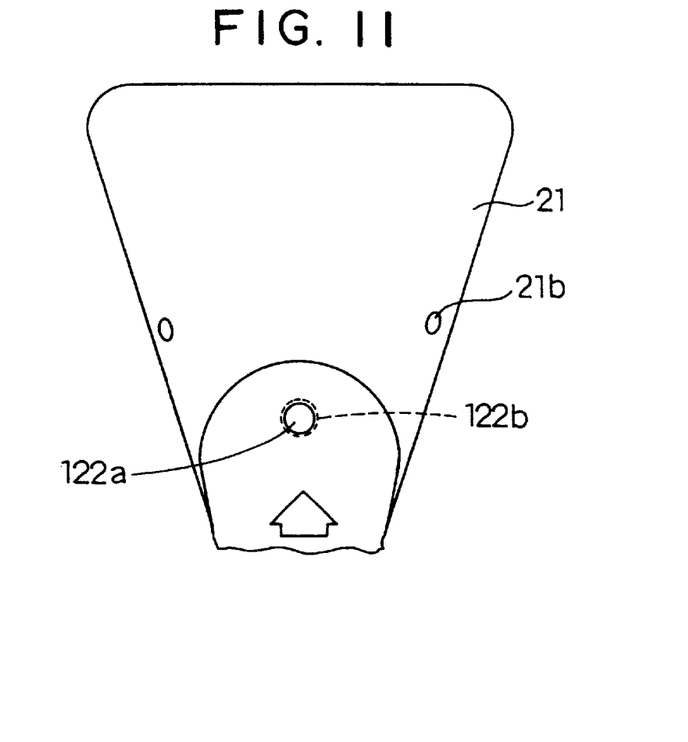
FIG. 11 is a front view showing an air bag device according to a twelfth embodiment of the present invention.
Figure 12:
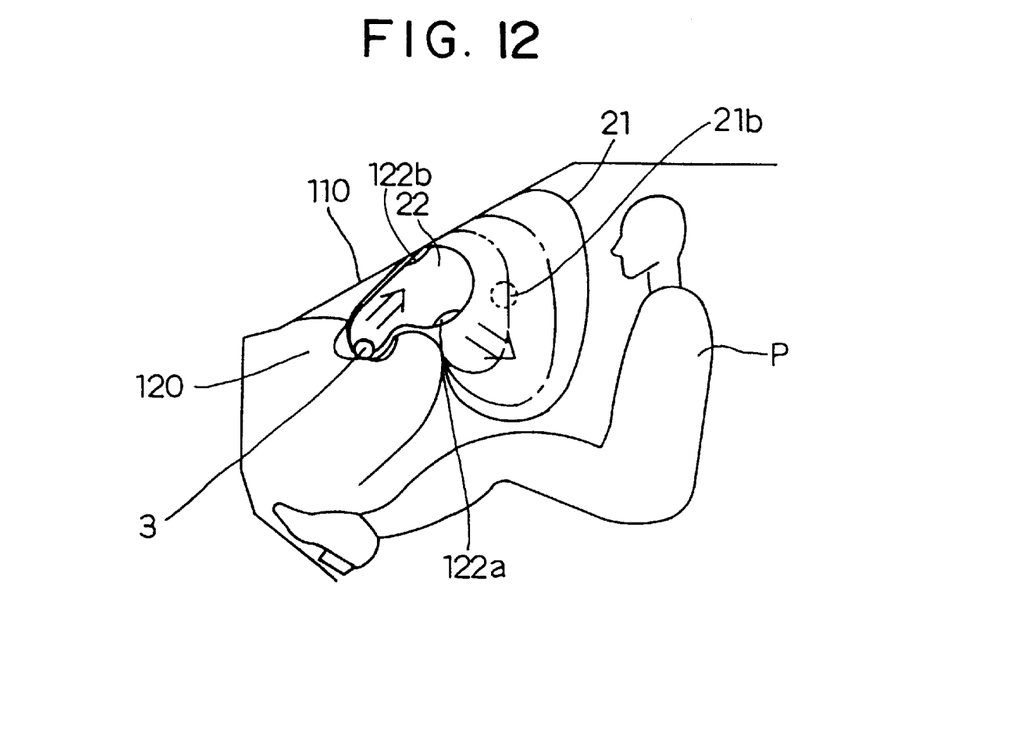
FIG. 12 is a schematic view showing the air bag device of FIG. 11 when the air bag is expanded in the vehicle.

FIGS. 11 and 12 show an inner bag according to a twelfth embodiment of the present invention.

The twelfth embodiment is similar in structure to the tenth embodiment shown in FIG. 9, except that the air bag device is mounted in an upper, rather than a center, portion of an instrument panel. The inner bag includes opposing through holes 122a, 122b that are substantially equal in size. As shown in FIG. 11, through hole 122b is axially aligned with the through hole 122a, and is thus hidden from view.

When the air bag device is deployed, gas escaping from the through hole 122a causes the bag body to expand toward the legs and lower body portion of the passenger, while gas escaping from the through hole 122b causes the bag body to expand toward the windshield. Although the through holes are substantially equal in size, gas escaping from the through hole 122b is impeded by the windshield. Thus, the bag body expands toward the legs and lower body portion of the passenger more quickly than it expands toward the head and upper body portion of the passenger, as shown in FIG. 12.

Although the through holes in the twelfth embodiment are shown as being substantially equal in size, the size of each of the holes may vary according to the desired rate of expansion of the upper and lower bag body portions.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An air bag device, which expands upon collision of a vehicle to protect a passenger on a passenger seat and which when installed in said vehicle is disposed to oppose a windshield in an instrument panel, comprising:

a bag body having a gas inlet hole;

gas generating means for generating gas to expand said bag body, said bag body communicating with said gas generating means through said gas inlet hole;

an inner bag disposed inside of said bag body to cover said gas inlet hole;

a first hole portion, on said inner bag which is disposed to oppose a waist of the passenger on the passenger seat when said inner bag is expanded, said first hole portion being defined in an outer circumferential side of said inner bag opposite said gas generating means when said inner bag is expanded; and a second hole portion defined in said inner bag at a front end side thereof with respect to said first hole portion to allow said gas to flow along an inner surface of said bag body conforming to an inner surface of said windshield when said inner bag is expanded;

wherein said bag body is for being expanded by gas which is supplied from said gas generating means and discharged from said first and second hole portions.

2. An air bag device according to claim 1, wherein at least one of said first hole portion and said second hole portion of said inner bag includes a pair of through-holes on said inner bag at positions adjacent to each other.

3. An air bag device according to claim 2, further comprising:

a gas discharging hole on only one side of said gas generating means;

wherein opening areas of said pair of through-holes are different from each other.

4. An air bag device according to claim 1, further comprising a third hole portion on said bag body on an outer circumferential side thereof with respect to said inner bag when said inner bag is expanded.

5. An air bag device according to claim 1, wherein said inner bag is made of two pieces of cloth having said first hole portion and said second hole portion respectively.

6. An air bag device according to claim 1, wherein said inner bag has a substantially arc shape.

7. An air bag device according to claim 1, wherein an opening area of said second hole portion is larger than that of said first hole portion.

8. An air bag device, for being expanded upon collision of a vehicle to protect a passenger on a passenger seat and for being disposed to oppose a windshield in an instrument panel, comprising:

a bag body having a gas inlet hole;

gas generating means for generating gas to expand said bag body, said bag body communicating with said gas generating means via said gas inlet hole;

an inner bag having a substantially arc-shaped outer peripheral configuration and disposed inside of said bag body to cover said gas inlet hole, said inner bag being formed from first and second bag pieces, at least one of the first and second bag pieces further defining a first hole portion;

said first hole portion opposing a passenger waist area associated with the passenger seat when said inner bag is expanded.

9. An air bag device according to claim 8, wherein:

said second hole portion on said inner bag opposes said gas inlet hole; and an opening area of said second hole portion is smaller than that of said first hole portion.

10. An air bag device according to claim 8, wherein said first hole portion includes of a pair of through-holes formed on said inner bag and arranged at positions adjacent to each other.

11. An air bag device according to claim 10, further comprising:

a gas discharging hole on only one side of said gas generating means;

wherein opening areas of said pair of through-holes are different from each other.

12. An air bag device according to claim 8, wherein:

said second hole portion is at a front end side thereof with respect to said first hole portion; and said air bag body is for being expanded by gas discharged from said first hole portion.

13. An air bag device that expands upon collision of a vehicle to protect a passenger on a passenger seat and that is disposed to oppose a windshield in an instrument panel, comprising:

a bag body having a gas inlet hole;

gas generating means for generating gas to expand said bag body, said bag body communicating with said gas generating means through said gas inlet hole;

an inner bag disposed inside said bag body to cover said gas inlet hole;

said inner bag defining a first hole portion that is disposed to oppose a lower body portion of the passenger on the passenger seat when said inner bag is expanded, said first hole portion being disposed on an outer circumferential side of said inner bag opposite said gas generating means when said inner bag is expanded; and said inner bag also defining a second hole portion at a windshield side thereof to allow said gas to flow along an inner surface of said bag body conforming to an inner surface of said windshield when said inner bag is expanded;

wherein said bag body is expanded by said gas which is supplied from said gas generating means and discharged from said first and second hole portions of said inner bag.

14. The air bag device of claim 13, wherein said first and second hole portions of said inner bag oppose one another.

15. The air bag device of claim 13, wherein said first and second hole portions are equal in size.

16. The air bag device of claim 13, wherein said second hole portion is disposed on said inner bag at a location that causes said windshield to impede discharge of said gas from said second hole portion.

* * * * *